United States Patent
Daniels, Jr.

(10) Patent No.: US 6,523,684 B1
(45) Date of Patent: Feb. 25, 2003

(54) FLEXIBLE CD CARRYING AND STORAGE DEVICE

(76) Inventor: Larry G. Daniels, Jr., 3410 Shellmacher Ave., Bakersfield, CA (US) 93307

(*) Notice: Subject to any disclaimer, the term of this patent is extended or adjusted under 35 U.S.C. 154(b) by 0 days.

(21) Appl. No.: 09/838,931

(22) Filed: Apr. 20, 2001

(51) Int. Cl.[7] .......................... B65D 85/57; B65D 27/08
(52) U.S. Cl. ................ 206/308.1; 229/72; 229/120.02; 229/117.01; 229/120.08; 229/162
(58) Field of Search ...................... 206/308.1, 310–313, 206/309, 232, 776–778; 229/72, 75, 76, 87.06, 117.01, 117.05, 117.06, 162, 120.02, 120.08, 120.18

(56) References Cited

U.S. PATENT DOCUMENTS

| | | | |
|---|---|---|---|
| 575,461 A | * 1/1897 | Cooke, Jr. | 229/117.05 |
| 2,945,617 A | * 7/1960 | Normandin | 229/67.3 |
| 3,199,768 A | * 8/1965 | Farmlett | 206/312 |
| 3,337,119 A | * 8/1967 | Bowers et al. | 206/309 |
| 4,313,558 A | * 2/1982 | Benham | 229/72 |
| 4,401,257 A | * 8/1983 | Benham | 229/72 |
| 4,473,153 A | * 9/1984 | Colangelo | 206/308.3 |
| D369,106 S | 4/1996 | Baker et al. | |
| 5,513,749 A | 5/1996 | Simmons | |
| 5,556,683 A | 9/1996 | Ranalli | |
| 5,669,491 A | 9/1997 | Pettey | |
| 5,692,607 A | 12/1997 | Brosmith et al. | |
| 5,823,333 A | * 10/1998 | Mori | 206/308.1 |
| 5,931,293 A | * 8/1999 | Seelenmeyer | 206/308.1 |
| 6,053,311 A | 4/2000 | Grobecker et al. | |
| 6,328,160 B1 | * 12/2001 | Cooksey | 206/224 |
| 6,386,360 B1 | * 5/2002 | Williams | 206/308.1 |

* cited by examiner

*Primary Examiner*—Mickey Yu
*Assistant Examiner*—Jila M Mohandesi

(57) ABSTRACT

A flexible CD carrying and storage device for carrying and storing compact discs. The flexible CD carrying and storage device includes a container having a back wall, side walls, front wall, bottom wall, an open top, a storage compartment disposed therein, and a divider being disposed in the storage compartment and separating the storage compartment into pockets with the pockets being adapted to receive and store CD's therein; and also includes a flap member being attached to the back wall for removably covering the open top to close the pockets; and further includes sheets of transparent material being disposed in the pockets.

7 Claims, 1 Drawing Sheet

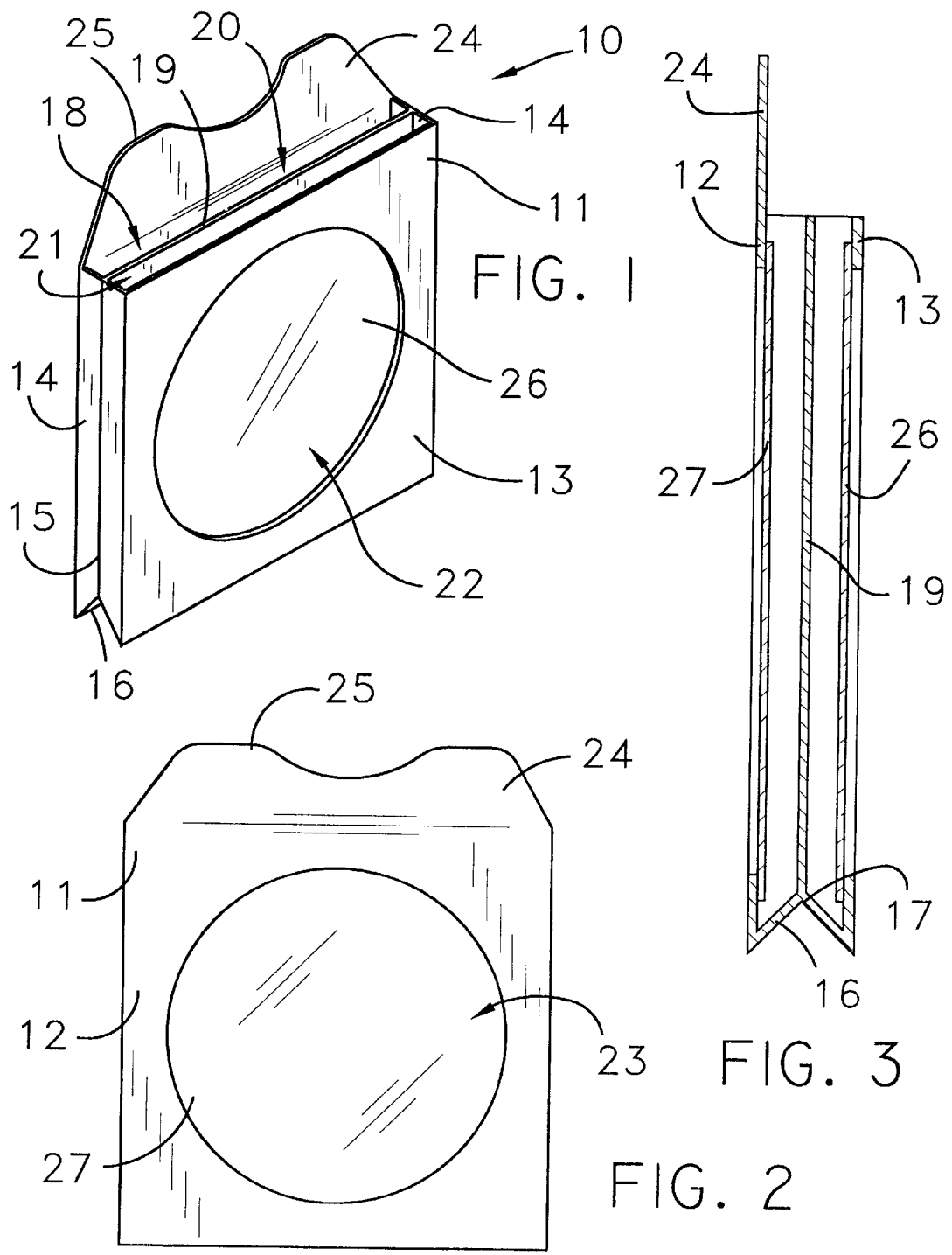

FLEXIBLE CD CARRYING AND STORAGE DEVICE

BACKGROUND OF THE INVENTION

1. Field of the Invention

The present invention relates to CD storage cases and more particularly pertains to a new flexible CD carrying and storage device for carrying and storing compact discs.

2. Description of the Prior Art

The use of CD storage cases is known in the prior art. More specifically, CD storage cases heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,692,607; U.S. Pat. No. 5,556,683; U.S. Pat. No. 5,669,491; U.S. Pat. No. 6,053,311; U.S. Pat. No. 5,513,749; and U.S. Pat. No. Des. 369,106.

While these devices fulfill their respective, particular objectives and requirements, the aforementioned patents do not disclose a new flexible CD carrying and storage device. The inventive device includes a container having a back wall, side walls, front wall, bottom wall, an open top, a storage compartment disposed therein, and a divider being disposed in the storage compartment and separating the storage compartment into pockets with the pockets being adapted to receive and store CD's therein; and also includes a flap member being attached to the back wall for removably covering the open top to close the pockets; and further includes sheets of transparent material being disposed in the pockets.

In these respects, the flexible CD carrying and storage device according to the present invention substantially departs from the conventional concepts and designs of the prior art, and in so doing provides an apparatus primarily developed for the purpose of carrying and storing compact discs.

SUMMARY OF THE INVENTION

In view of the foregoing disadvantages inherent in the known types of CD storage cases now present in the prior art, the present invention provides a new flexible CD carrying and storage device construction wherein the same can be utilized for carrying and storing compact discs.

The general purpose of the present invention, which will be described subsequently in greater detail, is to provide a new flexible CD carrying and storage device which has many of the advantages of the CD storage cases mentioned heretofore and many novel features that result in a new flexible CD carrying and storage device which is not anticipated, rendered obvious, suggested, or even implied by any of the prior art CD storage cases, either alone or in any combination thereof.

To attain this, the present invention generally comprises a container having a back wall, side walls, front wall, bottom wall, an open top, a storage compartment disposed therein, and a divider being disposed in the storage compartment and separating the storage compartment into pockets with the pockets being adapted to receive and store CD's therein; and also includes a flap member being attached to the back wall for removably covering the open top to close the pockets; and further includes sheets of transparent material being disposed in the pockets.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new flexible CD carrying and storage device which has many of the advantages of the CD storage cases mentioned heretofore and many novel features that result in a new flexible CD carrying and storage device which is not anticipated, rendered obvious, suggested, or even implied by any of the prior art CD storage cases, either alone or in any combination thereof.

It is another object of the present invention to provide a new flexible CD carrying and storage device which may be easily and efficiently manufactured and marketed.

It is a further object of the present invention to provide a new flexible CD carrying and storage device which is of a durable and reliable construction.

An even further object of the present invention is to provide a new flexible CD carrying and storage device which is susceptible of a low cost of manufacture with regard to both materials and labor, and which accordingly is then susceptible of low prices of sale to the consuming public, thereby making such flexible CD carrying and storage device economically available to the buying public.

Still yet another object of the present invention is to provide a new flexible CD carrying and storage device which provides in the apparatuses and methods of the prior art some of the advantages thereof, while simultaneously overcoming some of the disadvantages normally associated therewith.

Still another object of the present invention is to provide a new flexible CD carrying and storage device for carrying and storing compact discs.

Yet another object of the present invention is to provide a new flexible CD carrying and storage device which includes a container having a back wall, side walls, front wall, bottom wall, an open top, a storage compartment disposed therein, and a divider being disposed in the storage compartment and separating the storage compartment into pockets with the pockets being adapted to receive and store CD's therein; and also includes a flap member being attached to the back wall for removably covering the open top to close the pockets; and further includes sheets of transparent material being disposed in the pockets.

Still yet another object of the present invention is to provide a new flexible CD carrying and storage device that is easy and convenient to use.

Even still another object of the present invention is to provide a new flexible CD carrying and storage device that can be folded and collapsed for easy storage when needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new flexible CD carrying and storage device according to the present invention.

FIG. 2 is a back elevational view of the present invention.

FIG. 3 is a cross-sectional view of the present invention.

DESCRIPTION OF THE PREFERRED EMBODIMENT

With reference now to the drawings, and in particular to FIGS. 1 through 3 thereof, a new flexible CD carrying and storage device embodying the principles and concepts of the present invention and generally designated by the reference numeral 10 will be described.

As best illustrated in FIGS. 1 through 3, the flexible CD carrying and storage device 10 generally comprises a container 11 having a back wall 12, side walls 14, front wall 13, bottom wall 16, an open top 18, a storage compartment 20,21 disposed therein, and a divider 19 being conventionally disposed in the storage compartment 20,21 and separating the storage compartment 20,21 into two pockets with the pockets being adapted to receive and store CD's therein. The container 11 further includes openings 22,23 being disposed through the front and back walls 12,13. Each of the side and bottom walls 14,16 has a longitudinal fold 15,17 being centrally disposed therein and extending a length thereof thus forming side portions which are foldable upon one another to generally collapse the container 11. The divider 19 is conventionally attached along the longitudinal folds 15,17 of the side and bottom walls 14,16. The walls 12–14,16 and the divider 19 are made of pliable and durable paper with the container 11 measuring approximately 5 inches by 5 inches. Each of the openings 22,23 has a diameter of approximately 4 inches with the walls 12–14,16 having a thickness of approximately 1/16 inch.

A flap member 24 is integrally attached to the back wall 12 for removably covering the open top 18 to close the pockets 20,21. The flap member 24 is integrally attached to a top edge of the back wall 12 and has a contoured outer edge 25 with the contoured outer edge 25 being generally sinusoidal shaped. Two sheets of transparent material 26,27 are conventionally disposed in the pockets 20,21. The sheets of transparent material 26,27 are conventionally attached to the front and back walls 12,13 in the pockets 20,21 and cover the openings 22,23 in the front and back walls 12,13. The sheets of transparent material 26,27 are made of cellophane.

In use, the user opens the flap member 24 and places one compact disc in one pocket 20,21 and places another compact disc in the other pocket 20,21, and then closes the flap member 24 over the pockets 20,21 to prevent the compact discs from falling out of the container 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flexible CD carrying and storage device comprising:
a container having a storage compartment, said container having a front wall, a back wall, a pair of side walls, and a bottom wall defining said compartment, said container having an open top for accessing said storage compartment;
said bottom wall having a longitudinal fold being centrally disposed therein and extending a length thereof forming a pair of side portions, each of said side portions being angled away from said fold towards a respective one of said front and back walls such that said bottom wall has an inverted V-shape when said container is in an upright position;
said container including a divider being mounted to and extending between each of said walls of said container, said divider being centrally positioned in said storage compartment and separating said storage compartment into generally symmetrical pockets, said divider extending from an upper edge of said front, back, and side walls of said container and adjoining said bottom wall along said fold of said bottom wall;
each of said pockets being adapted to receive and store a CD therein;
wherein a bottom portion of the CD's is biased away from said divider by said side portions of said bottom wall when the CD's are fully received in said pockets to facilitate positioning of the CD's adjacent to said front and back walls;
a foldable flap member for selectively covering said open top to close each of said pockets; and sheets of transparent material being disposed in said pockets.

2. A flexible CD carrying and storage device as described in claim 1, wherein said container further includes openings being disposed through said front and back walls; and wherein each of said openings comprises a substantial amount of a surface area of each of said respective walls such that approximately all of the CD's is visible when positioned in said pockets.

3. A flexible CD carrying and storage device as described in claim 2, wherein said sheets of transparent material are attached to said front and back walls in said pockets and cover said openings in said front and back walls, said sheets of transparent material being made of cellophane.

4. A flexible CD carrying and storage device as described in claim 1, wherein said container comprises a generally durable, semi-rigid paper material such that said container is generally lightweight while maintaining an ability to protect the CD's positioned therein.

5. A flexible CD carrying and storage device as described in claim 1, wherein said flap member is mounted to and extends away from upper edge of said back wall and has a contoured outer edge for engaging said upper edge of said front wall.

6. A flexible CD carrying and storage device as described in claim 5, wherein said contoured outer edge of said flap member includes an arcuate recess that extends between a pair of outer tab portions, each of said tab portions being positionable inside said front wall of said container when said flap member is folded onto said open top to facilitate holding said flap member in a closed position over each of said pockets; and wherein said recess of said flap member extends above said upper edge of said front wall when said tabs are fully engaged with said front wall thereby permitting a user to utilize said recess to disengage said tab portions from said front wall.

7. A flexible CD carrying and storage device comprising:

a container having a storage compartment for storing CD's, said container having a front wall, a back wall, a pair of side walls, and a bottom wall defining said compartment, said container having an open top for accessing said storage compartment, said bottom wall having a longitudinal fold being centrally disposed therein and extending a length thereof forming a pair of side portions, each of said side portions being angled away from said fold towards a respective one of said front and back walls such that said bottom wall has an inverted V-shape when said container is in an upright position;

said container having openings being disposed through said front and back walls, each of said openings comprising a substantial amount of a surface area of each of said respective walls such that approximately all of the CD is visible when positioned in said pocket;

said container including a divider being mounted to and extending between each of said walls of said container, said divider being centrally positioned in said storage compartment and separating said storage compartment into generally symmetrical pockets, each of said pockets being adapted to receive and store a CD therein, said divider extending from an upper edge of said front, back, and side walls of said container and adjoining said bottom wall along said fold of said bottom wall;

wherein a bottom portion of the CD's is biased away from said divider by said side portions of said bottom wall when the CD's are fully received in said pockets to facilitate positioning of the CD's adjacent to said front and back walls;

sheets of transparent material for protecting the CD's being disposed in said pockets, said sheets of transparent material being attached to said front and back walls in said pockets and covering said openings in said front and back walls;

wherein said container comprises a generally durable, semi-rigid paper material such that said container is generally lightweight while maintaining an ability to protect the CD's positioned therein;

a foldable flap member for selectively covering said open top to close each of said pockets, said flap member being mounted to and extending away from said upper edge of said back wall and having a contoured outer edge for engaging said upper edge of said front wall, said contoured outer edge of said flap member including an arcuate recess extending between a pair of outer tab portions, each of said tab portions being positionable inside said front wall of said container when said flap member is folded onto said open top to facilitate holding said flap member in a closed position over each of said pockets; and wherein said recess of said flap member extends above said upper edge of said front wall when said tabs are fully engaged with said front wall thereby permitting a user to utilize said recess to disengage said tab portions from said front wall.

* * * * *